May 3, 1949.   H. MORRISON   2,468,995
HEIGHT GAUGE
Filed Aug. 31, 1944

WITNESS—
E. L. Feiding

INVENTOR.
Harry Morrison.
BY
Paul E. Friedemann

Patented May 3, 1949

2,468,995

UNITED STATES PATENT OFFICE 2,468,995

HEIGHT GAUGE

Harry Morrison, Pittsburgh, Pa.

Application August 31, 1944, Serial No. 552,099

3 Claims. (Cl. 248—346)

My invention relates to distance measuring devices, and more particularly to attachments to height gages.

In many machining and finishing operations on a work piece, the work piece has to be accurately positioned with respect to a reference surface, or plane. This reference surface is usually a horizontal table top, or horizontal surface, on a machine on which the work piece is to be mounted. The reference plane may, of course, take other than a horizontal position.

To make perpendicular measurements from the reference surface reliable, the surface often has to be finished to almost optical accuracy so that all points on the surface fall substantially in a geometric plane. Distance gages as now in use on such reference surfaces have a flat foot-like base having a lower surface, or sole, also finished to almost optical accuracy so that all points in the lower surface of the base, or sole, fall substantially in the same geometic plane.

Such accurate surfaces, while essential for the purposes in mind, are not conducive to a speedy set-up of the work piece. Often a workman, when making the first trial measurement with a height gage from the reference surface to the work piece wastes considerable time and nerve energy in removing the gage or shifting it to a different position on the surface, because once the gage base is placed on the surface the two surfaces adhere to each other as if glued together. Further, during shifting of the gage, it chatters along the base surface making reading of the measurement difficult and inaccurate.

The reference surface, or table top, to use less expensive material is made of glass, some hard plastic or some other inexpensive material, which materials seem to possess an added affinity for the material forming the base of the gage. The result is more delay and annoyance.

One broad object of my invention is the provision of a non-sticking gage base, without loss of accuracy of the gage.

Another and more specific object of my invention is the provision of an attachment to a height gage base that may be readily and accurately attached to the main gage base and which attachment will facilitate the use of the gage without causing sticking of the gage to the reference surface.

It is also another broad object of my invention to provide a gage base having three or more non-aligned point contacts falling in a plane normal to the length of a gage for engaging a reference surface.

It is also an object of my invention to provide a base for a gage that does not stick to the reference surface and which may be readily resurfaced again and again without impairing its accuracy or its non-sticking character.

A more specific object of my invention is the provision of an auxiliary base for a gage having a bottom surface, for coaction with a reference surface, presenting a plurality of spaced contact points all falling substantially in the same plane.

The objects hereinbefore recited are merely illustrative, because many other objects and advantages will become more apparent from a study of the following specification and the accompanying drawing, in which.

Figure 1:
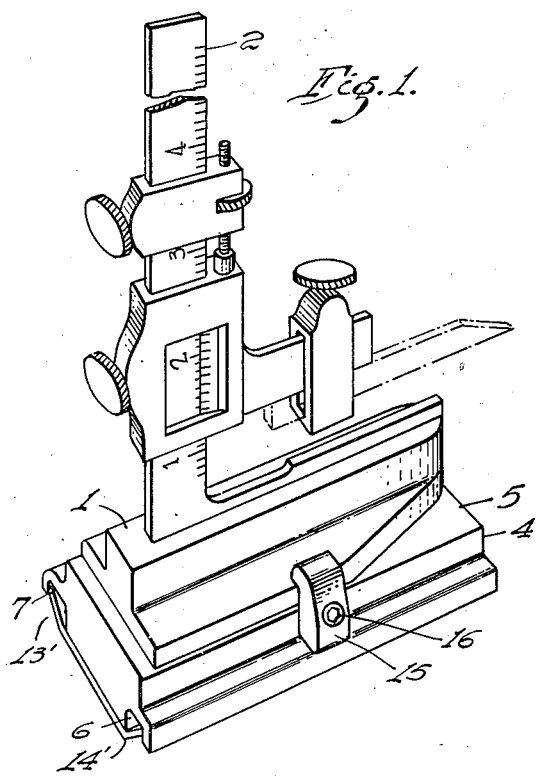
Figure 1 is a perspective view of a height gage provided with the preferred embodiment of my invention.

In Fig. 1, I show a conventional height gage having the base 1 and the upright 2. The upright is provided with suitable graduations reading upwardly from the bottom surface of the attachment, or adapter 3. The upright is also provided with suitable verniers and is provided with suitable projecting work piece engaging devices which are slidably mounted on the upright.

The adapter 3 is made of an upper relatively heavy solid block 4 which is machined to have a true upper surface 5 for receiving the true bottom surface of the base 1. The bottom is accurately grooved as shown at 6 and 7 for receiving the two rows of ball bearings 8 and 9 which are thus bearings of the roller type. No special ball bearings are necessary because ball bearings now regularly for sale can be obtained to almost any degree of accuracy in dimensions.

To provide a suitable ball bearing race, I use a plate 10 attached by suitable screws to the base 4. The plate 10 is provided with the projecting corners 11, 12, 13 and 14 which I bend upwardly as shown at 13' and 14' to maintain the ball bearings in the race formed by the edges of the plate 10 and the grooves 6 and 7.

To firmly hold the adapter 3 on the base 1, I provide one or more lugs, such as 15, on each side of the base 1. These lugs 15 are designed to produce a wedging action on the base 1 to firmly hold it on the surface 5 when the bolts are tightened down.

From the foregoing, it is apparent that the adapter is provided with two elongated ball bearing races holding the ball bearings shown.

Three single triangularly spaced roller bearings, or four such bearings disposed respectively, at the corners of the adapter have been found not very satisfactory because single balls in sockets fail to roll satisfactorily and tend to give a directive effect to the movement of the gage. The most satisfactory arrangement is the one I have shown where two rows with a relatively large number of balls are used.

Figure 4:
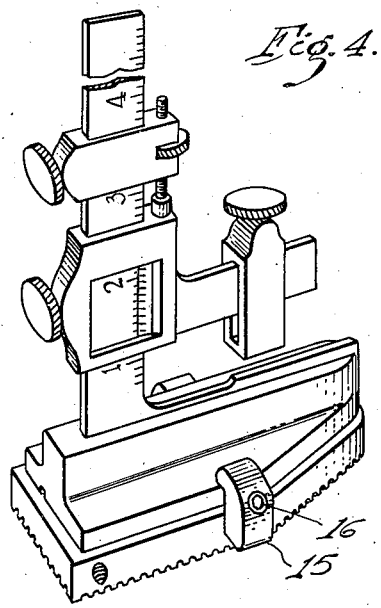
Fig. 4 is a perspective view of a height gage provided with a modification of my invention.
Figure 2:
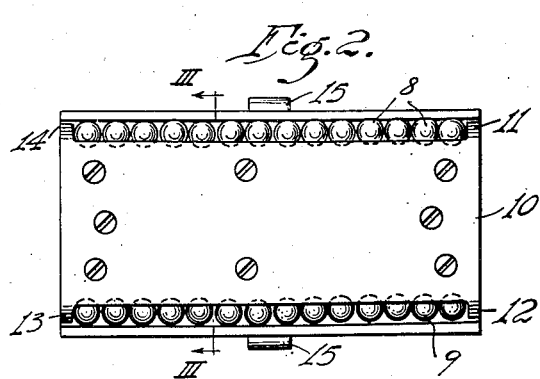
Fig. 2 is a bottom view of the adapter, or attachment, shown with the height gage shown in Fig. 1.
Figure 5:
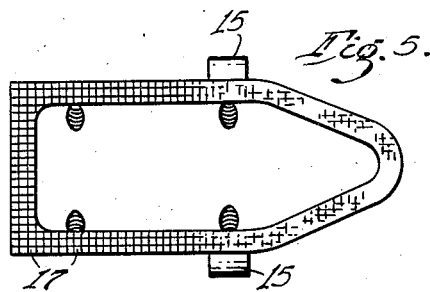
Fig. 5 is a bottom view of the adapter shown with the height gage shown in Fig. 4.
Figure 3:
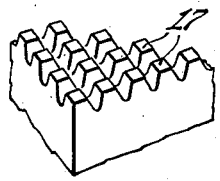
Fig. 3 is a transverse sectional view on line III—III of Fig. 2.
Figure 6:
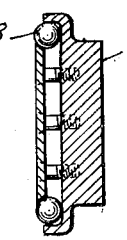
Fig. 6 is a perspective enlarged view of a broken-out portion of the adapter shown in Figs. 4 and 5.

The adapter shown in Figs. 4 to 6 is secured to the height gage by means of lugs 15' and bolts 16' exactly as the adapter shown in Figs. 1, 2 and 3 but instead of using roller bearings I provide the bottom surface base of the adapter with a plurality of transverse intersecting relatively deep striations so as to provide the bottom surface with a plurality of projections as 17. The ends of the projections all fall substantially in the same plane and thus provide a gage base that is as accurate as those now in use but which base does not stick to the reference surface. The modification shown in Figs. 4, 5 and 6 has another advantage over the type of gage base, now in use, in that it may again and again be readily resurfaced in the event it becomes worn in use.

While I have shown and described but two species of my invention, I do not wish to be limited to the specific embodiments illustrated and described but wish to be limited only by the scope of the claims hereto appended.

I claim as my invention:

1. An auxiliary base for a measuring instrument having a foot-like base with a bottom plane surface, said auxiliary base comprising a generally rectangular block having a plane top surface for receiving the bottom surface of the foot-like base, means for clamping the bases together; roller bearing races along the longer outer bottom edges of the auxiliary base, and a row of roller type bearings of uniform size in each of the races, whereby movement of the instrument on a plane reference surface is facilitated.

2. An adapter base for a measuring instrument having a bottom foot-like support provided with a bottom surface all points of which fall substantially in the same plane, said adpater comprising a generally rectangularly shaped block having a top surface all points of which fall substantially in the same plane so as to receive the bottom surface of the support thereon, means for rigidly connecting the base and support, and two parallelly disposed rows of roller type bearings in the bottom of the base to thus be adapted to form a plurality of rolling point contact with any plane reference surface in connection with which the measuring instrument may be used.

3. An adapter base for an elongated instrument for measuring distances, said adapter comprising a flat plate, a pair of parallel rows of roller type bearings mounted in one face of the said plate so that the exposed contact points, or surfaces, of the rollers all fall substantially in the same plane, and means for rigidly connecting one end of the instrument to the other face of the adapter so that the contact points of the rollers all fall substantially in the plane normal to the longitudinal axis of the instrument.

HARRY MORRISON.

REFERENCES CITED

The following references are of record in the file of this patent:

UNITED STATES PATENTS

| Number | Name | Date |
|---|---|---|
| 491,840 | Field | Feb. 14, 1893 |
| 1,404,425 | Bartholdy | Jan. 24, 1922 |
| 2,060,543 | White | Nov. 10, 1936 |
| 2,177,399 | Aller | Oct. 24, 1939 |

FOREIGN PATENTS

| Number | Country | Date |
|---|---|---|
| 10,165 | Great Britain | May 5, 1903 |